(12) United States Patent
Van Der Wiel

(10) Patent No.: US 7,691,652 B2
(45) Date of Patent: Apr. 6, 2010

(54) CALORIMETRIC FLOW METER

(75) Inventor: Appolonius Jacobus Van Der Wiel, Tervuren (BE)

(73) Assignee: Melexis NV, Ieper (BE)

( * ) Notice: Subject to any disclaimer, the term of this patent is extended or adjusted under 35 U.S.C. 154(b) by 964 days.

(21) Appl. No.: 10/551,514

(22) PCT Filed: Apr. 2, 2004

(86) PCT No.: PCT/IB2004/001012

§ 371 (c)(1),
(2), (4) Date: Jun. 16, 2006

(87) PCT Pub. No.: WO2004/088255

PCT Pub. Date: Oct. 14, 2004

(65) Prior Publication Data

US 2006/0234414 A1  Oct. 19, 2006

(30) Foreign Application Priority Data

Apr. 2, 2003  (GB) ................... 0307616.3

(51) Int. Cl.
H01L 21/00 (2006.01)
(52) U.S. Cl. .................... 438/25; 438/26; 257/E21.521
(58) Field of Classification Search .................. 438/25, 438/26, 55; 73/861.355, 861.356, 861.357
See application file for complete search history.

(56) References Cited

U.S. PATENT DOCUMENTS 4,542,650 A  9/1985 Lemay et al.
6,395,585 B2  5/2002 Brandl

FOREIGN PATENT DOCUMENTS

DE  19511687 A  10/1996
EP  0813236 A  12/1997

Primary Examiner—Hsien-ming Lee
(74) Attorney, Agent, or Firm—Townsend and Townsend and Crew LLP

(57) ABSTRACT

An encapsulated calorimetric flow meter according to the present invention comprises an integrated circuit (104) mounted on a lead frame (102). The integrated circuit has a channel (105) provided in its lower face, the channel being aligned with two holes (103) provided in the lead frame, the holes coinciding with the ends of the channel (105). There are further slots (111) in the lead frame (102) alongside the integrated circuit to thermally isolate it from the rest of the lead frame (102), which acts as a heat sink to keep the entry and exit fluid at ambient temperature. The flow meter is manufactured by mounting the integrated circuit (104) on to a suitable lead frame (102). The assembly of integrated circuit (104) and lead frame (102) is then inverted and blobs of gel (112, 114) are then deposited onto the lead frame (102) covering the holes (103). The assembly is then inserted into a mould (100) and encapsulated within a suitable mould compound. When the assembly is ejected from the mould cavity the gel can be removed and the holes (103) and the channel (105) exposed to facilitate fluid flow into, out of and along the channel (105).

12 Claims, 2 Drawing Sheets

CALORIMETRIC FLOW METER

BACKGROUND OF THE INVENTION

The present invention relates to calorimetric flow meters, in particular calorimetric flow meters implemented as integrated circuits and to a method of manufacturing such a calorimetric flow meter.

Calorimetric flow meters measure mass flow and are used in industry and in the medical profession to measure the flow of a fluid. A typical calorimetric flow meter comprises a tube heated by a heater located halfway along the tube, the unheated ends of the tube remaining at ambient temperature. When the heater is on and no fluid flows in the tube the heating causes a temperature distribution in the tube whereby the temperature drops linearly with distance from the heater. When a fluid flow is present in the tube, heat exchange takes place between the tube and the fluid. Upstream from the heater fluid flow will cool the tube slightly and downstream the fluid flow will heat the tube slightly. The resultant temperature distribution along the tube is now uneven. Temperature sensors positioned halfway between the heater and the ends of the tube are operative to detect the difference $\Delta T$ between the measured upstream and downstream temperatures.

The temperature difference $\Delta T$ between upstream and downstream is proportional to the mass flow rate $\phi_m$. The relation between the temperature difference $\Delta T$ and mass flow rate $\phi_m$ is also dependant on the heat conductivity of the tube and the heat capacity of the fluid.

The mass flow rate $\phi_m$ to temperature difference $\Delta T$ relation is not dependant upon the fluids viscosity or heat conductivity unlike for hot-wire or Venturi sensors advantageously making the calibration of a Calorimetric Flow Meter independent of the fluid. In order to make it convenient to use a Calorimetric Flow Meter in a wide range of industrial applications it is necessary to be able to produce a low cost robust Calorimetric Flow Meter. The best presently available Calorimetric Flow Meters are manufactured substantially from silicon and are potentially easy to damage.

It is therefore an object of the present invention to provide an improved Calorimetric Flow Meter.

SUMMERY OF THE INVENTION

According to a first aspect of the present invention there is provided a Calorimetric Flow Meter comprising an integrated circuit assembly incorporating a fluid flow channel, at least two temperature sensing elements operative to measure the temperature in different regions of the channel and a heating element located in between the temperature sensing elements to heat a region of the channel, wherein the integrated circuit assembly is encapsulated in a housing, the housing defining a fluid inlet allowing fluid to enter the channel and a fluid outlet allowing fluid to exit the channel.

Such an arrangement allows a Calorimetric Flow Meter to be implemented using silicon integrated circuit-based sensors which offer the user improved accuracy and reliability together with small size, low weight and when implemented together with digital or microprocessor control, enhanced flexibility and performance thus reducing the cost of the flow meter and making it suitable for a wide range of applications. Furthermore encapsulation of the integrated circuit provides a robust flow meter which also increases the range of applications to which it is suited.

Preferably, the channel is provided upon a reverse face of the integrated circuit assembly and the temperature sensing elements and the heating element are provided upon a front face of the integrated circuit assembly. Most preferably the heating element is located above the midpoint of the channel and there are two temperature sensing elements each being positioned substantially equidistant between the heating element and ends of the channel.

Preferably the temperature sensing elements are operative to detect a temperature difference between their locations.

Preferably the integrated circuit is a CMOS integrated circuit. Most preferably means are provided to allow communication between the integrated circuit and external circuitry. The means for allowing communication may be a direct electrical connection or may be a wireless connection. The integrated circuit may additionally incorporate processing means to calculate a mass flow from the temperature difference detected by the temperature sensing elements. Alternatively the necessary processing circuitry may be provided externally.

Additional circuit elements may be incorporated into the integrated circuit. These additional circuit elements may be used to control the heating means, interface between the heating and sensing means and external electronic control means, receive and store calibration data for the temperature sensing means, convert analogue signals to digital signals, carry out calculations on the digital signals to facilitate improved or additional performance or to improve accuracy or to compensate the measurements for external or internal change or error or carry out such actions and processes as are common in electronically controlled sensors.

Preferably the integrated circuit assembly is mounted on a lead frame, holes in the lead frame coinciding with each end of the channel, the lead frame otherwise lying across the length of the channel so as to form a wall of the channel. Most preferably the lead frame has slots alongside the portion of the lead frame that forms a wall of the channel, the slots extending through the thickness of the lead frame, and act to thermally isolate the channel from the rest of the lead frame. Preferably the slots do not extend past the holes in the lead frame at either end of the channel, thus allowing the bulk of the lead frame to act as a heat sink for the ends of the channel, thus helping to maintain them at or close to the ambient temperature.

In a further alternative embodiment there are additionally implemented on the integrated circuit temperature measurement means at the fluid inlet and the fluid outlet such that the errors due to the inlet and outlet temperatures not being equal can be corrected by calculation or otherwise.

According to a second aspect of the present invention there is provided a method of manufacturing an encapsulated calorimetric flow meter comprising the following steps: providing an integrated circuit assembly incorporating a fluid flow channel, at least two temperature sensing elements operative to measure the temperature in different regions of the channel, and a heating element located in between the temperature sensing elements to heat a region of the channel; applying a quantity of gel to the integrated circuit to cover at least each end of the channel, thereby forming a gel-covered assembly; inserting the gel-covered assembly into a cavity of a moulding tool ensuring that at least a portion of the gel is in contact with a surface of the cavity; introducing a plastic mould compound into the cavity so as to encapsulate the gel-covered assembly except for the portion where the gel is in contact with the cavity surface; and removing the gel-covered assembly from the cavity, whereby there is an opening defined in the plastic mould compound encapsulating the gel-covered assembly at each end of the channel, thus allowing fluid to flow through the channel after the gel has been removed.

In one preferred embodiment, to ensure that the channel is not filled by encapsulant it is filled with gel before the integrated circuit is encapsulated. Alternatively or additionally the step of mounting the integrated circuit on a lead frame before encapsulation is included, the lead frame having holes which coincide with the end of the channel when the integrated circuit is mounted and the gel being applied so as to cover the holes in the lead frame. In either embodiment this results in fluid being free to flow into one end of the channel and out of the other.

The heating element and temperature sensing elements may be formed by any suitable technique. The channel is preferably formed by etching, but alternatively may be formed by use of any other suitable technique.

BRIEF DESCRIPTION OF THE DRAWINGS

In order that the present invention is more clearly understood, a preferred embodiment of the invention will be described hereinafter with reference to the accompanying drawings, in which.

DETAILED DESCRIPTION OF PREFERRED EMBODIMENTS

Figure 1:
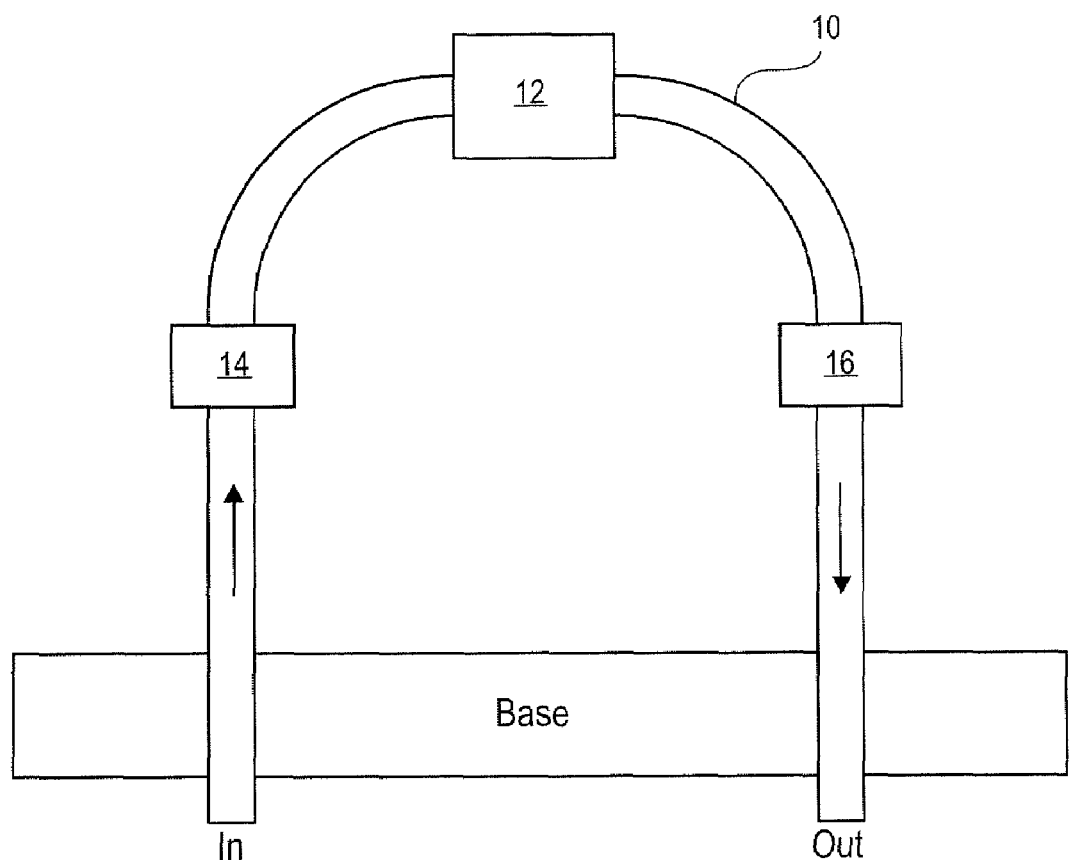
FIG. 1 shows a schematic diagram of a calorimetric flow meter

Referring to FIG. 1 a calorimetric flow meter known from the prior art comprises a tube 10 through which a fluid may flow. A heater 12 is positioned halfway along the tube 10. Upstream and downstream temperature sensors 14, 16 are provided located substantially halfway between the heater 12 and the ends of tube 10.

Figure 2:
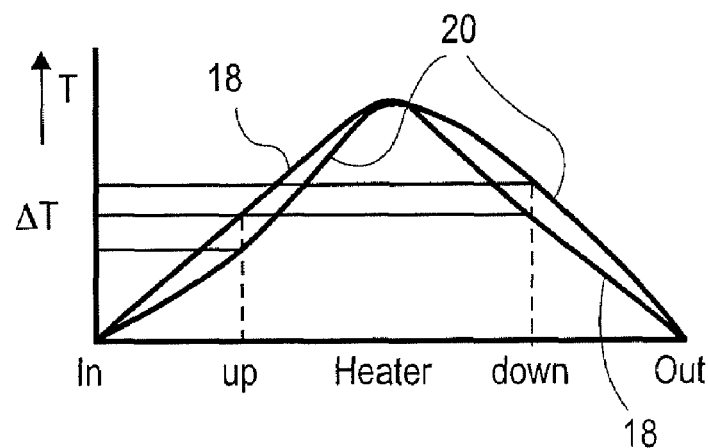
FIG. 2 shows a graphical representation of the temperature profile within the channel of a calorimetric flow meter

In the absence of fluid flow in the tube 10 and any temperature difference between the ends of the tube, the temperature distribution in the tube when heater 12 is switched on is represented by line 18 in FIG. 2. The temperature drops linearly with distance from the heater from a maximum value adjacent to the heater 12 to the ambient temperature at the ends of the tube 10. When fluid flows through the tube 10, heat exchange occurs between the fluid and the tube 10 and causes the temperature on the upstream side of the tube to drop slightly and the temperature on the downstream side of the tube to rise slightly.

The temperature sensors 14, 16 are operative to detect the temperature difference $\Delta T$ between the upstream and downstream sides of the tube. The mass flow rate $\phi_m$ is proportional to the temperature difference $\Delta T$ and thus by measuring the temperature difference $\Delta T$ the mass flow rate $\phi_m$ can be calculated. The relation between the mass flow rate $\phi_m$ and the temperature difference $\Delta T$ is described by the following expression $$\varphi_m = 8 \frac{k}{c_p} \frac{S}{L} \frac{\Delta T}{T_{heater}} \left[\frac{kg}{s}\right]$$

Where Cp is the heat capacity of the fluid, k is the heat conductivity of the tube, S is the cross section of the tube wall, L is the tube length, and $T_{heater}$ is the temperature of the heater.

Figure 3:
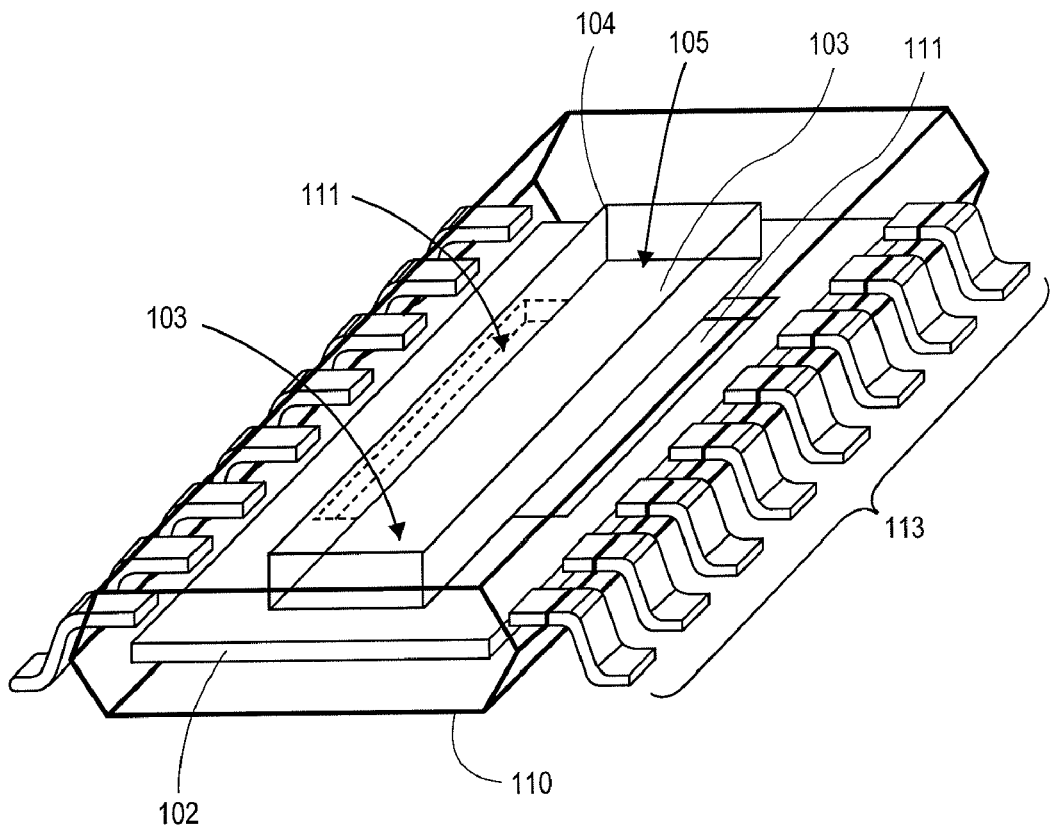
FIG. 3 shows an isometric view of a preferred embodiment of a low cost calorimetric flow meter in accordance with the present invention.
Figure 4:
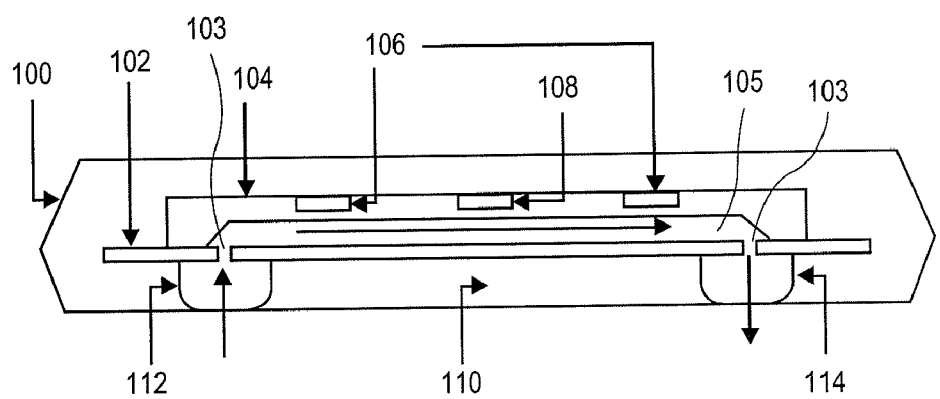
FIG. 4 shows a cross section through the flow meter along the centre line of the integrated circuit

FIGS. 3 and 4 show an encapsulated calorimetric flow meter according to the present invention comprising an integrated circuit 104 mounted on a lead frame 102. The integrated circuit has a channel 105 provided in its lower face, the channel being aligned with two holes 103 provided in the lead frame, the holes coinciding with the ends of the channel 105. There are further slots 111 in the lead frame 102 alongside the integrated circuit to thermally isolate it from the rest of the lead frame 102, which thereby acts as a heat sink to keep the entry and exit fluid at ambient temperature.

The integrated circuit has a heating element 108 and two temperature sensing elements 106 provided on its upper surface along with any other necessary control circuitry (not shown).

Typically control circuitry can be provided to control the heating means, interface between the heating and sensing means and external electronic control means, receive and store calibration data for the temperature sensing means, convert analogue signals to digital signals, carry out calculations on the digital signals to facilitate improved or additional performance or to improve accuracy or to compensate the measurements for external or internal change or error or to carry out other such actions and processes as are common, necessary or desired in electronically controlled sensors.

The heating element 108 is located above and in line with the centre of the channel 105. The temperature sensing elements 106 are located above the channel 105 and on opposite sides of the heating element 108 substantially equidistant between the heating element 108 and the ends of the channel 105. Typically the heating element 108 and the temperature sensing elements 106 are implemented as semiconductor elements using conventional CMOS processing.

The integrated circuit 104 and lead frame 102 are encapsulated within a suitable mould compound 110. This provides protection for the device and thereby enhances its reliability. Conducting pins 113 are provided allowing the integrated circuit 104 to be connected to external circuitry. Additionally holes are provided in the moulding compound allowing fluid access to the channel 105.

The flow meter is manufactured by first mounting a suitable integrated circuit 104 onto a suitable lead frame 102. The assembly of integrated circuit 104 and lead frame 102 is then inverted and blobs of gel 112, 114 are then deposited onto the lead frame 102 covering the holes 103. The assembly is then inserted into a mould 100 and encapsulated within a suitable mould compound. The quantity of gel deposited over each hole 103 is arranged to be such that the gel blob reaches from the surface of the lead frame to make contact with the side of the mould cavity.

When the assembly is ejected from the mould cavity the gel can be removed and the holes 103 and the channel 105 exposed to facilitate fluid flow into, out of and along the channel 105. Alternatively, the integrated circuit 104 can be mounted on a lead frame 102 having a slot corresponding to the channel 105. The channel 105 may then be filled with a quantity of gel before the assembly is encapsulated in a moulding compound. Holes allowing access to the channel 105 can be provided by providing pins or other projections in the mould tool 100 such that the pins or projections are in contact with the gel. In such embodiments, one wall of the channel is provided by the mould compound.

It is however to be understood that the invention is not to be restricted to the details of the above embodiments which are described by way of example only.

The invention claimed is:

1. A method of manufacturing an encapsulated calorimetric flow meter comprising the following steps:
providing an integrated circuit assembly incorporating a fluid flow channel, at least two temperature sensing elements operative to measure the temperature in different regions of the channel and a heating element located in between the temperature sensing elements to heat a region of the channel;
applying a quantity of gel to the integrated circuit to cover at least each end of the channel, thereby forming a gel-covered assembly;
inserting the gel-covered assembly into a cavity of a moulding tool ensuring that at least a portion of the gel is in contact with a surface of the cavity;
introducing a plastic mould compound into the cavity so as to encapsulate the gel-covered assembly except for the portion where the gel is in contact with the cavity surface; and
removing the gel-covered assembly from the cavity, whereby the plastic mould compound forms a case which encompasses the gel-covered assembly, wherein there are openings defined in the case at each end of the channel thus allowing fluid to flow through the channel.

2. A method as claimed in claim 1 wherein the channel is also filled with the gel before the integrated circuit assembly is encapsulated.

3. A method as claimed in claim 1 wherein the integrated circuit assembly is mounted on a lead frame.

4. A method as claimed in claim 3 wherein the lead frame has holes which coincide with the end of the channel when the integrated circuit assembly is mounted on the lead frame and the gel is applied so as to cover the holes in the lead frame.

5. A method as claimed in claim 4 wherein a wall of the channel is formed by a portion of the lead frame and wherein there are slots provided in the lead frame alongside that portion of the lead frame forming the wall of the channel.

6. A method as claimed in claim 5 wherein the slots do not extend past the holes in the lead frame at either end of the channel.

7. A method as claimed in claim 1 wherein the channel is formed by etching.

8. A method as claimed in claim 1 wherein the channel is provided upon a reverse face of the integrated circuit assembly and the temperature sensing elements and the heating element are provided upon a front face of the integrated circuit assembly.

9. A method as claimed in claim 1 wherein the integrated circuit assembly is a CMOS integrated circuit.

10. A method as claimed in claim 1 wherein means are provided to allow direct or wireless communication between the integrated circuit assembly and external circuitry.

11. A method as claimed in claim 1 wherein the integrated circuit assembly additionally incorporates processing means to calculate a mass flow from a temperature difference between upstream and downstream sides of a tube through which the fluid flow can flow, detected by the temperature sensing elements.

12. A method as claimed in claim 1 wherein additional circuit elements are incorporated into the integrated circuit assembly, said additional circuit elements including one or more elements selected from a group consisting of: means operative to interface between the heating and sensing elements and external electronic control means; means operative to receive and store calibration data for the temperature sensing elements; means operative to convert analogue signals to digital signals; means operative to carry out calculations on the digital signals to facilitate improved or additional performance or to improve accuracy or to compensate the measurements for external or internal change; and means provided at a fluid inlet and a fluid outlet such that the errors due to the inlet and outlet temperatures not being equal can be corrected by calculation.

* * * * *